(12) United States Patent
Adachi et al.

(10) Patent No.: US 8,793,872 B2
(45) Date of Patent: Aug. 5, 2014

(54) METHOD FOR MANUFACTURING CLOSED IMPELLER

(75) Inventors: Ryouhei Adachi, Gunma-ken (JP); Song Fei, Gunma-ken (JP); Hisayoshi Ono, Gunma-ken (JP)

(73) Assignee: Yamada Manufacturing Co., Ltd., Kiryu-Shi, Gunma-Ken (JP)

( * ) Notice: Subject to any disclaimer, the term of this patent is extended or adjusted under 35 U.S.C. 154(b) by 1174 days.

(21) Appl. No.: 12/659,761

(22) Filed: Mar. 19, 2010

(65) Prior Publication Data

US 2010/0242280 A1 Sep. 30, 2010

(30) Foreign Application Priority Data

Mar. 27, 2009 (JP) .................................. 2009-080679

(51) Int. Cl.
*B23P 15/02* (2006.01)

(52) U.S. Cl.
USPC .................. 29/889.7; 29/592; 29/889; 416/2; 416/223 R; 264/405; 264/442; 264/445; 264/69; 264/239

(58) Field of Classification Search
USPC ................. 29/592, 889, 889.7; 416/2, 223 R; 264/405, 442, 445, 69, 248, 239
See application file for complete search history.

(56) References Cited

U.S. PATENT DOCUMENTS

| 2,902,941 | A | | 9/1959 | Kiba | |
|---|---|---|---|---|---|
| 5,538,395 | A | * | 7/1996 | Hager | 416/144 |
| 6,146,094 | A | * | 11/2000 | Obana et al. | 415/200 |
| 6,805,531 | B2 | * | 10/2004 | Iida et al. | 415/206 |

FOREIGN PATENT DOCUMENTS

| DE | 299 04 668 U1 | 6/1999 |
|---|---|---|
| DE | 20 2005 021 324 U1 | 11/2007 |
| JP | 53-54301 | 5/1978 |
| JP | 53-54301 A | 5/1978 |
| JP | 61-46493 A | 3/1986 |
| JP | 62-243998 A | 10/1987 |
| JP | 2-277999 A | 11/1990 |
| JP | 2002-70792 A | 3/2002 |

OTHER PUBLICATIONS

Notification of Reason(s) for Refusal dated Jan. 22, 2013, with English translation.
European Search Report dated Dec. 30, 2011.

* cited by examiner

*Primary Examiner* — Peter DungBa Vo
*Assistant Examiner* — Azm Parvez
(74) *Attorney, Agent, or Firm* — McGinn IP Law Group, PLLC

(57) ABSTRACT

The present invention provides a method for manufacturing a closed impeller that has a simple configuration and enables fusion in a very accurate position. The method includes: forming a frustum-shaped front plate and a disk-shaped base plate formed therebelow, upper surfaces of a plurality of unit impeller blade plates made from a synthetic resin extending in radial directions which are formed as impeller blade tip surfaces, with sharp-pointed ridge-like protrusions having an acute upper end and a width less than a width of the impeller blade tip surface being integrally formed on the impeller blade tip surfaces. In the method, an inner surface of the front plate and the plurality of impeller blade tip surfaces are formed as parts of conical surfaces and formed so that the cone apex angles of the two conical surfaces are equal to each other. Then, the front plate is placed on the impeller blade and the ends of the sharp-pointed ridge-like protrusions and the inner surface of the front plate are brought into contact with each other. Small vibrations are then provided while applying an appropriate pressurizing force between the front plate and the impeller blade having the base plate attached thereto, the sharp-pointed ridge-like protrusions are melted, and the front plate is fused to the tip surfaces of the impeller blade.

20 Claims, 9 Drawing Sheets

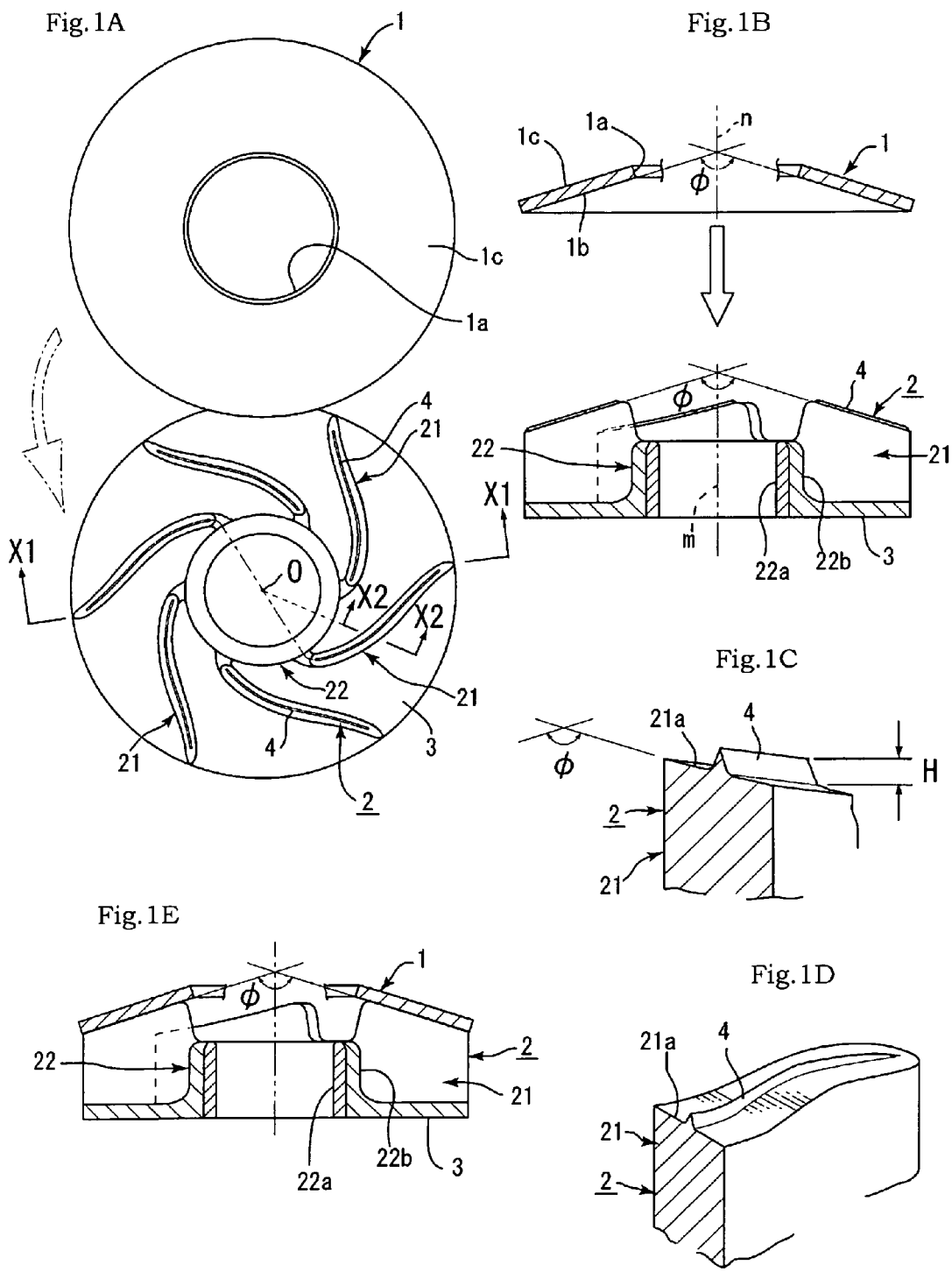

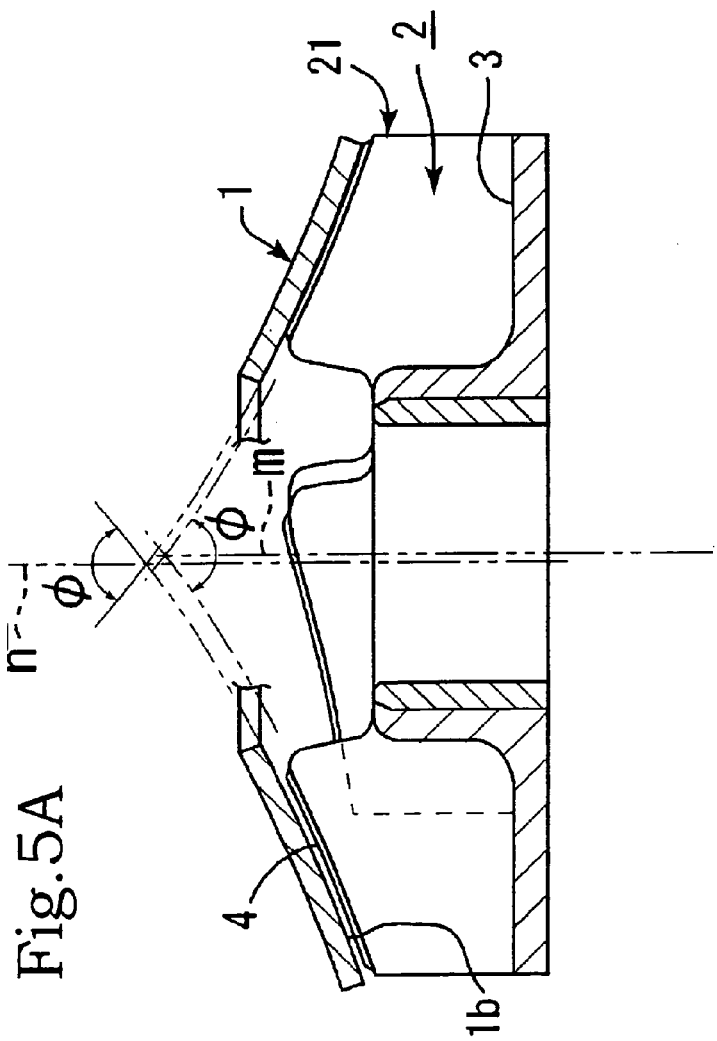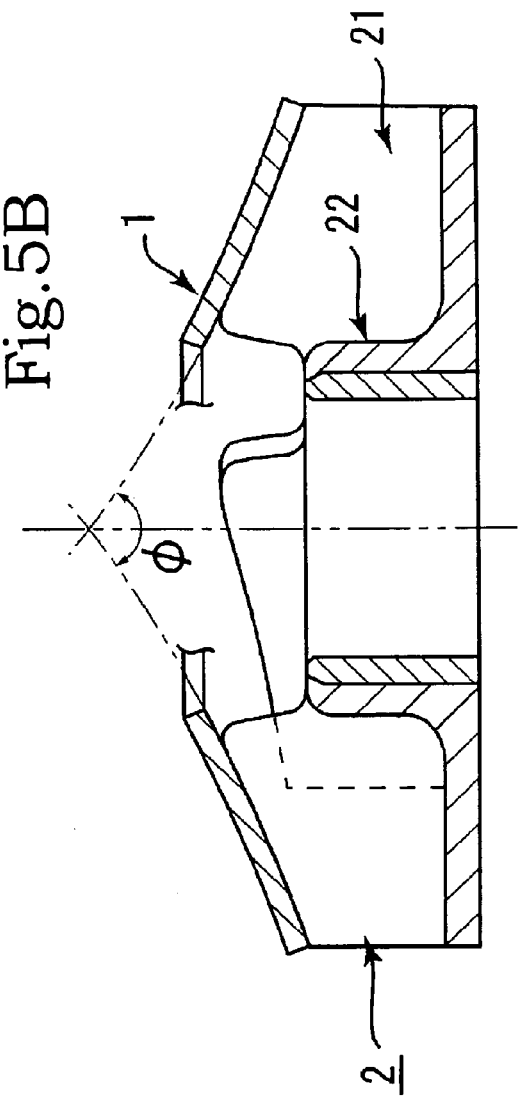

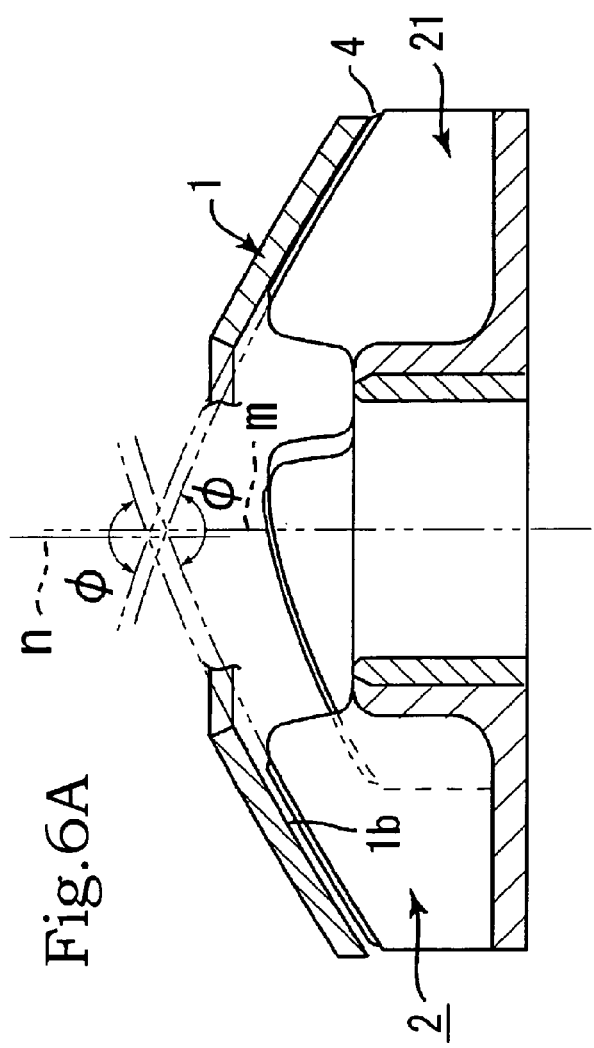
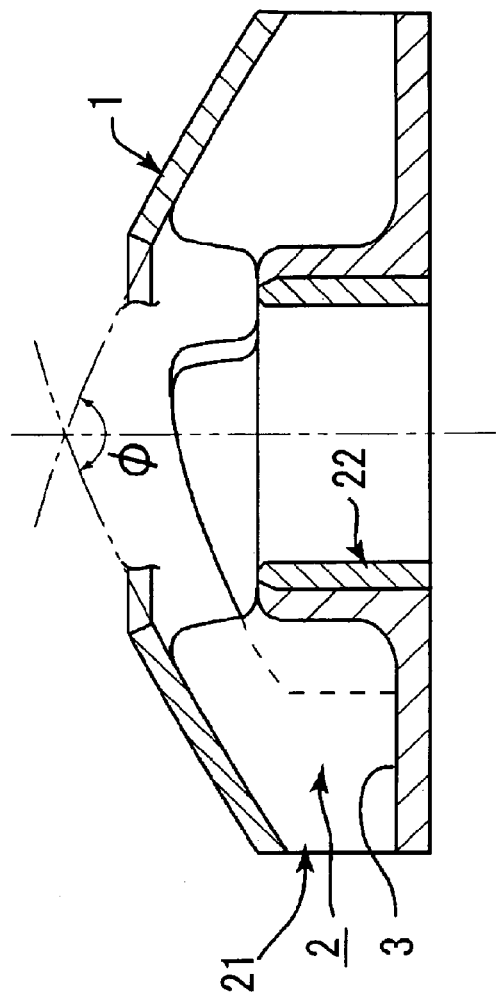

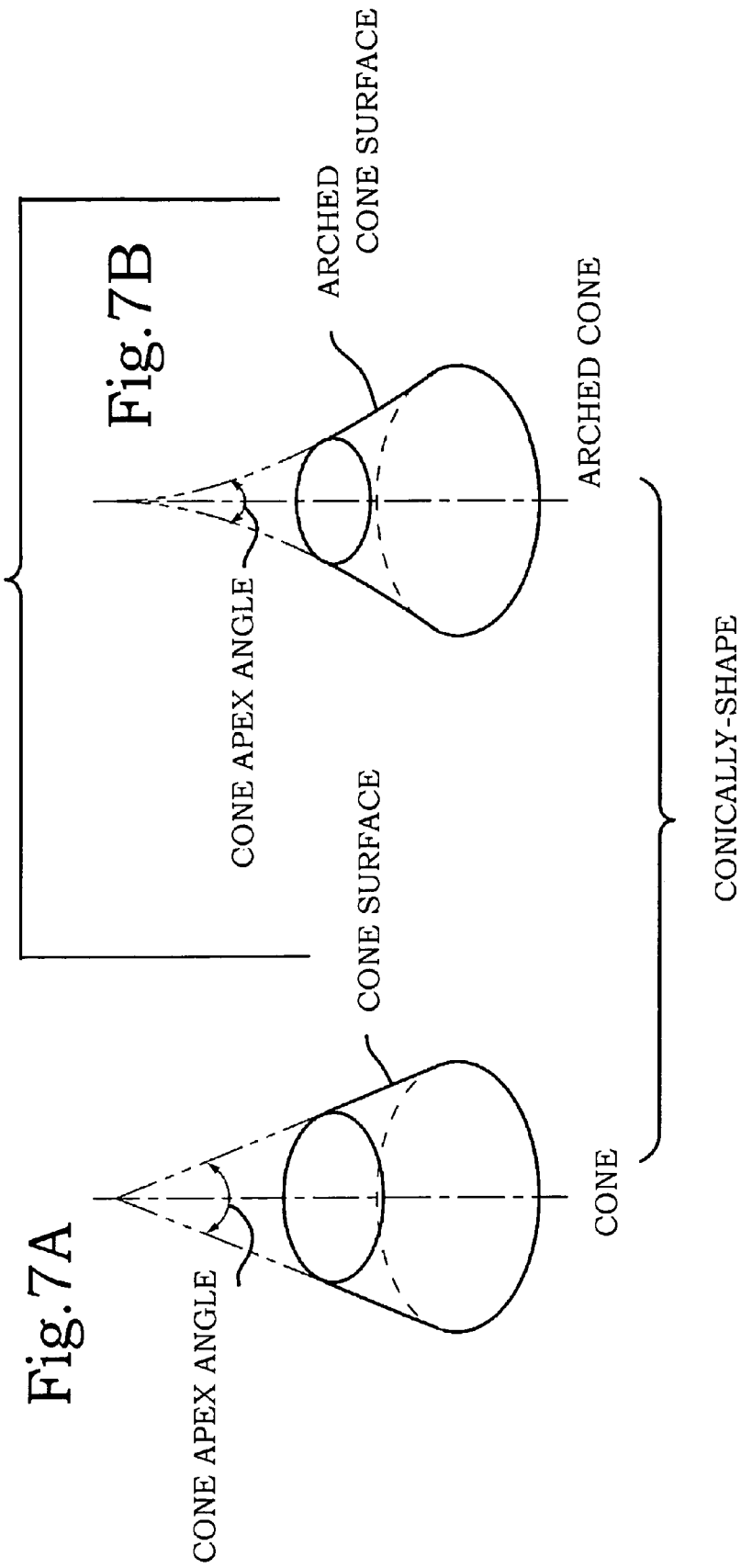

METHOD FOR MANUFACTURING CLOSED IMPELLER

BACKGROUND OF THE INVENTION

1. Field of the Invention

The present invention relates to a method for manufacturing a closed impeller that has a simple configuration and enables fusion in a very accurate position.

2. Description of the Related Art

Environmental concerns and cost efficiency issues created increased expectations and demand for vehicles with reduced fuel consumption. A variety of means have been used to reduce fuel consumption, and increase in efficiency is one of them. Water pumps are provided on vehicles (vehicles equipped with a gasoline engine, hybrid vehicles, and electric automobiles) to cool the engine and warm up the cabin. Due to a recently created demand for reduced power consumption and therefore for increased efficiency, water pumps have also been the object of active development aimed at additional increase in efficiency.

There are impellers for water pumps that are provided with the so-called front plate. Examples of such impellers provided with the front plate are described in Japanese Patent Application Laid-Open No. 53-54301 and U.S. Pat. No. 5,538,395. A structure in which a base plate (disk) serving as a base is provided in the root portion of the impeller blade has been widely implemented as a typical structure of a resin impeller, but an impeller structure in which a hole is provided in the central portion on the distal end (intake) side of the impeller blade and a front plate is provided to cover the impeller blade circumferentially has also been widely used to attain the increased efficiency.

In most manufacturing methods, the front plate, impeller blade, and base plate that are originally separate components are integrated in the production process and the front plate is eventually integrated with the impeller blade. This method is widely used for resin impellers because the components can be easily fused. Against the background of using the resin impellers, the increase in efficiency that is attained because the impeller blade shape can be set easier than in the case of conventional pressed (sheet metal) impellers and the reduction in weight with respect to the pressed (sheet metal) impellers also serve as important factor. The impeller in which the front plate is thus integrated with the impeller blade (having the base plate attached thereto) is called "closed impeller".

Japanese Patent Application Laid-Open No. 53-54301 discloses a manufacturing method of fusing "a member in which a front plate (front surface shroud 1) is integrated with an impeller blade (impeller blade portion 2)" and "a base plate (back surface shroud 3)" and a structure obtained thereby. U.S. Pat. No. 5,538,395 discloses a structure in which "a front plate (cover 2)" and "a member (bottom 1) in which an impeller blade and a base plate are integrated" are fused together and a manufacturing method therefor. A large number of means can be used for fusing two or more resin parts together, those parts being not limited to resin impellers. Examples of suitable means include: (1) ultrasonic waves, (2) vibrations, (3) laser, (4) heat plate, and (5) high-frequency radiation.

(1) Ultrasonic waves: resins are melted and fused together by applying sound waves with a frequency of about several tens of thousands of hertz to the components to be fused.

Typically, when the surfaces (flat surfaces) to be fused are pressed against each other in the vertical direction, the resin is not melted at the surfaces even when ultrasonic waves are applied. For this reason, one surface is left flat, but protrusions of a triangular shape are provided at the other surface to be fused as described in Japanese Patent Application Laid-Open No. 53-54301: FIG. 2 (see FIGS. 9A and 9B of the present application), FIG. 4 (see FIG. 9C of the present application), FIG. 5 (see FIGS. 9D and 9E of the present application), FIG. 6 and FIG. 7; U.S. Pat. No. 5,538,395: FIG. 2A, FIG. 3A, FIG. 4A, FIG. 4B (see FIG. 8B of the present application), FIG. 4C (see FIG. 8A of the present application), FIG. 5. Here ultrasonic waves are applied after the flat surface and surface with triangular protrusions have been pressed against each other, the resin starts melting at the tips of the triangular protrusions, and the two surfaces are fused together.

(2) Vibrations: a method by which the resin is melted by applying vibrations of a frequency of about several hundreds of hertz and fused.

(3) Laser: a method by which a laser beam is directed towards the zones to be fused and the resin is melted and fused.

(4) Hot plate: a method by which the resins at both sides are preheated to a high temperature and then pressed against each other to melt and fuse the resin surfaces.

(5) High frequency: a method by which a needle-shaped metal is heated by applying high frequency thereto and a resin surrounding the metal heated by the application of high frequency is melted and fused. Other fusion methods also exist, but the important fusion methods are described above.

In all these fusion methods, natural cooling is conducted once the resin of the surfaces to be fused has melted, the melted resin solidifies, and the surfaces are fixedly attached to each other.

The case in which "the member in which the front plate is integrated with the impeller blade" and the "base plate" are fused together, as in Japanese Patent Application Laid-Open No. 53-54301, will be investigated below in greater detail. When such fusion of components is conducted, the surfaces to be fused are both flat, as shown in the drawings of Japanese Patent Application Laid-Open No. 53-54301. Further, the description indicates that the flat surfaces are pressed against each other and ultrasonic fusion is conducted. Such fusion has the following features and limitations.

Because flat surfaces of two members are pressed against each other and irradiated by ultrasonic waves, very small vibrations are generated in the two members irradiated with ultrasonic waves. Because the two members are made from a resin and the resin does not withstand a large force if the members are pressed against each other too strongly, the members cannot be pressed together by a large force. Therefore, the aforementioned small vibrations cause relative displacement of the two members. In this case, because the surfaces to be fused are flat, as described in Japanese Patent Application Laid-Open No. 53-54301, the impeller itself does not provide any means for inhibiting the displacement, and the two members move independently in the respective directions. The resultant significant drawback is that the back surface shroud 3 and impeller blade portion 2 easily shift relative to each other in the radial (transverse) direction. Accordingly, in order to prevent such a radial (transverse) displacement, the fusion has to be conducted by providing a ring-shaped positioning member on the outside of the impeller in the circumferential direction with a certain gap between the impeller and the positioning member.

From another standpoint, because flat surfaces are fused together as shown in FIG. 2 of Japanese Patent Application Laid-Open No. 53-54301, even when the front surface shroud 1 and impeller blade portion 2 are fused together supposedly as separate component, because the front surface shroud 1 has a flat surface and the side end surface of the impeller blade portion 2 is also flat, it is still necessary to conduct fusion by providing the positioning member in the same manner as described above. Thus, where the front surface shroud 1 and the side end surface of the impeller blade portion 2 are to be fused together without using the positioning member, a displacement in the radial (transverse) direction can occur between the front surface shroud 1 and impeller blade portion 2. Because of such displacement in the radial (transverse) direction, an eccentric centrifugal force acts upon the front surface shroud 1 when the impeller is rotated and the service life of the bearing subjected to such eccentric centrifugal force can be shortened. In addition, because the front surface shroud 1 is disposed with a displacement in the radial (transverse) direction, a region where the front surface shroud 1 is not present that corresponds in size to the displacement amount of the front surface shroud 1 appears on the opposite side in the displacement direction of the front surface shroud 1. Since there appears a region having no front surface shroud 1 that is provided to increase the discharge performance, the pump capacity can be reduced.

Observing the impeller blade tip surface 14 described in U.S. Pat. No. 5,538,395, FIG. 4C (see FIG. 8A of the present application), FIG. 4B (see FIG. 8B of the present application), and other drawings, protrusions of triangular shape for fusion are provided over the entire region of the impeller blade tip surface, as shown in the drawings. In other words, the entire surface of the impeller blade tip surface is a protrusion of a triangular shape for fusion. Conversely, no surface similar in shape to the so-called flat surface is present at the impeller blade tip surface. The impeller blade tip surface can be fused to the front plate by forming the protrusion of a triangular shape for fusion over the entire surface of the impeller blade tip surface, assembling with the front plate, and applying a fusion means such as ultrasonic waves, vibrations, laser, heat plate, and high frequency. High frequency is used in the examples of U.S. Pat. No. 5,538,395.

With the above-described fusion method, fusion can be attained, but although the fusion is possible, the following problems are encountered at the stage of actual implementation. Thus, there is a time interval (period) in which ultrasonic waves, vibrations, or high frequency are applied to the surfaces to be fused, as described in U.S. Pat. No. 5,538,395, in a state in which the resin of the surfaces to be fused is in a molten state produced by the fusion means. Fine observation of the molten state of the resin at the surfaces to be fused demonstrates that the molten resin is present at the impelled blade tip surface and the front plate assumes a floating state thereabove with the molten resin being interposed therebetween. Where the ultrasonic waves, vibrations, or high frequency are applied in such a floating state of the front plate, the front plate can be easily shifted in the radial (transverse) direction.

In order to prevent such "a displacement of the front plate during fusion", a positioning member of a circular shape that has a diameter slightly larger than that of the front plate is disposed in the same manner as described in Japanese Patent Application Laid-Open No. 53-54301 on the outer circumference of the front plate so as to prevent the front plate from shifting in the radial (transverse) direction. One means for reducing the displacement of the front plate and impeller in the radial (transverse) direction during fusion involves reducing the clearance between the front plate and the positioning member, but where the clearance is simply reduced, it becomes difficult to insert the front plate into the positioning member when the two are assembled. The resultant problem is that productivity drops.

Further, when fusion is conducted without using the positioning member, the front plate is fixedly attached in a state in which the center of gravity thereof is shifted outward from the impeller center. Therefore, when the water pump operates, an eccentric centrifugal force act upon the front plate and the service life of the bearing subjected to such eccentric centrifugal force can be shortened. In addition, because the front plate is disposed with a displacement in the radial (transverse) direction, a region where the front plate is not present that corresponds in size to the displacement amount of the front plate appears on the opposite side in the displacement direction of the front plate. Since there appears a region having no front plate that is provided to increase the discharge performance, the pump capacity can be reduced.

Further, in the configuration described in U.S. Pat. No. 5,538,395, as shown in FIG. 8D, where the height of the impeller blade tip surface 14 is denoted by W0 and the height of the triangular protrusion is denoted by W1, when the impeller blade tip surface and the front plate are fused by applying a fusion means such as high frequency, depending on the fusion degree of the triangular protrusions, the height of the base plate and the lower surface of the front plate becomes the height W that normally does not have a constant value, as shown in FIG. 8D.

SUMMARY OF THE INVENTION

As described hereinabove, methods for increasing the efficiency of impellers, which are as important as flow paths for increasing the efficiency of water pumps, have been developed and implemented. Furthermore, in recent years a demand for low-cost vehicles has greatly increased. With the foregoing in view, the present invention provides a means for attaining increased efficiency at a low cost. The problem (technical problem or object) to be resolved by the present invention is to attain the increase in efficiency by improving an impeller, which is as important as flow paths, and realize the desired cost reduction.

The results of comprehensive research conducted by the inventors to resolve the above-described problems demonstrate that the problems can be resolved by the invention as in claim 1 that provides a method for manufacturing a closed impeller, the method comprising: forming a frustum-shaped front plate and a disk-shaped base plate formed therebelow, upper surfaces of a plurality of unit impeller blade plates made from a synthetic resin extending in radial directions which are formed as impeller blade tip surfaces, with sharp-pointed ridge-like protrusions having an acute upper end and a width less than a width of the impeller blade tip surface being integrally formed on the impeller blade tip surfaces; forming an inner surface of the front plate and the plurality of impeller blade tip surfaces formed as parts of conical surfaces and formed so that cone apex angles of the two conical surfaces are equal to each other, with the front plate being placed on the impeller blade having the base plate attached thereto, and the sharp-pointed ridge-like protrusions and the inner surface of the front plate being brought into contact with each other; providing small vibrations while applying an appropriate pressurizing force between the front plate and the impeller blade having the base plate attached thereto; melting the sharp-pointed ridge-like protrusions; and fusing the front plate to the impeller blade tip surfaces.

The invention as in claim 2 resolves the above-described problems by providing the method for manufacturing a closed impeller according to claim 1, wherein the height of the sharp-pointed ridge-like protrusion is substantially uniform.

The invention as in claim 3 or 7 resolves the above-described problems by providing the method for manufacturing a closed impeller according to claim 1 or 2, wherein the conical shape of the front plate and impeller blade tip surface is formed as a cone surface. The invention as in claim 4 or 8 resolves the above-described problems by providing the method for manufacturing a closed impeller according to claim 1 or 2, wherein the conical shape of the front plate and impeller blade tip surface is formed as an arched cone surface. The invention as in claim 5, 9, 10 or 11 resolves the above-described problems by providing the method for manufacturing a closed impeller according to claim 1, 2, 3, or 4, wherein the front plate is formed from the same material as the unit impeller blade plate. The invention as in claim 6, 12, 13 or 14 resolves the above-described problems by providing the method for manufacturing a closed impeller according to claim 1, 2, 3, or 4, wherein the front plate is formed from a metal different from that of the unit impeller blade plate.

According to the invention as in claim 1, firstly, the front plate can be accurately fused to the center of the impeller blade. Secondly, although the front plate has no grooves, the front plate can be fused easily and in a simple manner. Thus, in the closed impeller manufacturing by fusing the impeller blade tip surface and the front plate, a sharp-pointed ridge-like protrusion of a triangular shape that serves as a starting porting for melting the resin is provided at the impeller blade tip surface, and a surface serving as part of a conical surface is present outside the sharp-pointed ridge-like protrusion on the impeller blade tip surface. Further, the front plate also has a conical surface corresponding to the shape of the impeller blade tip surface. When the sharp-pointed ridge-like protrusion is melted by a resin melting means using vibrations, because both the impeller blade tip surface other than the sharp-pointed ridge-like protrusion and the front plate are still solid bodies, the impeller blade tip surface other than sharp-pointed ridge-like protrusion, which is the solid body, and the inner surface of the front plate, which is the solid body, are continuously subjected to small impacts under the effect of a vibration means such as ultrasonic waves, whereby the front plate is moved towards the center. In other words, where the front plate displaced from the center moves towards the center, this movement is typically called "alignment". In the present specification, it will be called "alignment action". The major advantage is that central joining can be attained naturally without providing a groove or the like as shown in FIGS. 9C to 9E (related art).

Because of the "alignment action", the displacement of the impeller blade and front plate in the radial (transverse) direction, which is the problem inherent to the related art, is eliminated. Therefore, after the front plate has been guided to the impeller blade tip surface and set thereon in the manufacturing process, subsequent fusion can result in fusing the front plate in the central position of the impeller by the alignment action of the impeller blade tip surface serving as a conical surface and the front plate serving as a conical surface. As a result, production quality and productivity can be greatly increased. As for the functions, because the front plate is fused without being shifted from the center, the center of gravity thereof is not displaced and rotational vibrations caused by non-uniform centrifugal force does not occur. The resultant merit is that the service life of the bearing is extended.

Further, because the front plate almost entirely covers the impeller blade, the desired discharge performance can be obtained. The resin melts at the sharp-pointed ridge-like protrusion and the impeller blade tip surface is practically not melted. Therefore, the front plate is fixedly attached to the impeller blade tip surface in an accurate contact position.

Thus, the fusion position of the front plate can be accurately determined. With the above-described vibration generating means using (1) ultrasonic waves, (2) vibrations, and (5) high frequency, it is possible to produce the alignment action, which is the effect of the present invention, and fuse the front plate and the impeller blade together. Furthermore, describing the effect of the present invention in a simple manner, the alignment action makes it possible to conduct fusion in an accurate position, without providing the front plate with a groove for positioning. Thus, because no groove is present in the front plate, the front plate can be assembled in a simple manner, without confirming visually the attachment angle of the front plate. Therefore, production efficiency can be greatly increased.

According to the invention as in claim 2, efficient fusion is attained by forming the sharp-pointed ridge-like protrusion of almost uniform height and bringing the inner surface of the front plate into uniform contact with the sharp-pointed ridge-like protrusion. According to the invention as in claim 3, the shape is simple and cost can be reduced. According to the invention as in claim 4, there is a degree of freedom in selecting the shape and the discharge capacity can be further increased. According to the invention as in claim 5, fusion can be improved and production control can be facilitated by forming the front plate of the same material as the unit impeller blade plate. According to the invention as in claim 6, the alignment action can be easily produced even when the front plate is formed from a resin different from that of the unit impeller blade plate or from a different metal. Further, where the front plate is made from a metal, the thickness can be reduced by comparison with that obtained with the resin, while ensuring the same strength. Therefore, the height of the impeller blade can be accordingly increased and the discharge capacity can be further increased.

BRIEF DESCRIPTION OF THE DRAWINGS

FIG. 1A is a plan view illustrating how the front plate is fused to the impeller blade with the base plate attached thereto, FIG. 1B is a cross-sectional view illustrating how the front plate is fused to the impeller blade with the base plate attached thereto, in particular showing a cross-sectional view of the impeller blade with the base plate attached thereto along the X1-X1 arrows in FIG. 1A, FIG. 1C is a cross-sectional view (cross section passing through the cone apex point) along the arrows X2-X2 in FIG. 1A, FIG. 1D is a partial perspective view of the impeller blade, and FIG. 1E is a cross-sectional view of a state in which the fusion of the front plate to an impeller blade with the base plate attached thereto is completed;

FIG. 5A is a state diagram of another embodiment of the present invention illustrating how the manufacturing method is started by abutting the front plate on the protrusions of the impeller blade apexes, and FIG. 5B is a cross-sectional view illustrating the completion of fusion by the manufacturing method illustrated by FIG. 5A;

FIG. 6A is a state diagram of yet another embodiment of the present invention illustrating how the manufacturing method is started by abutting the front plate on the protrusions of the impeller blade apexes, and FIG. 6B is a cross-sectional view illustrating the completion of fusion by the manufacturing method illustrated by FIG. 6A;

FIG. 7A is a perspective view of a cone, and FIG. 7B is a perspective view of an arched cone;

DESCRIPTION OF THE PREFERRED EMBODIMENTS

Figure 2A:
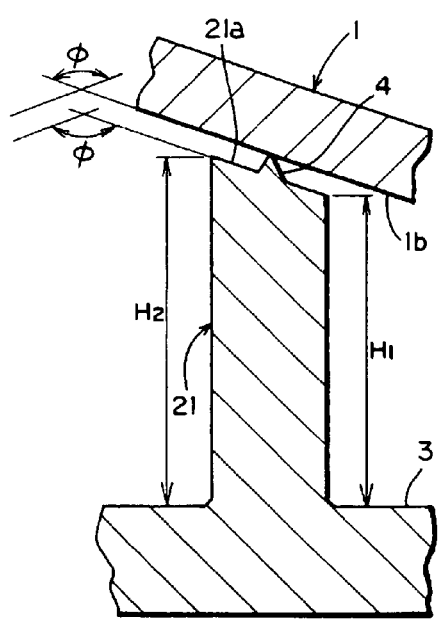
FIG. 2A is a state diagram of the present invention illustrating how the manufacturing method is started by abutting the front plate on the protrusions of the impeller blade apexes.

Embodiments of the present invention will be described below with reference to FIGS. 1 to 6. In the figures, the reference numeral 1 stands for a front plate that is an annular plate of a frustum shape (horn shape). In the cross-sectional view, the front plate is a disk (ring) having an open round hole 1a in the center and forming a convexity that narrows upward with respect to a vertical central axis n and has a height that decreases towards the outer periphery. The thickness of the front plate is about 1 to 2 mm and the material thereof is a synthetic resin. In the first embodiment, the front plate 1 is an annular plate of a flat horn shape obtained by cutting off the head section of any cone. In other words, in the first embodiment, a cone-shaped type is explained. The cone apex angle (also called "steric angle") in the virtual apex location of an inner surface 1b (lower side in FIG. 1B) of the cone surface of the front plate 1 is denoted by φ (see FIG. 1B).

The reference numeral 2 stands for an impeller blade. A disk-shaped base plate 3 is formed integrally with the lower side of the impeller blades 2. Such a member is called impeller blade 2 with the base plate 3 attached thereto. In the impeller blades 2, the base portions of a plurality of unit impeller blade plates 21, 21, . . . are formed integrally with the outer periphery of a boss section 22 in the form of a cylindrical piece. The boss portion 22 is constituted by a main boss portion body 22a made from a metal and having a through hole formed in the central portion thereof and a thick portion 22b on the outer peripheral side with respect to the main boss portion body 22a. The thick portion 22b is formed so that a root section of the unit impeller blade plate 21 and the central portion of the base plate 3 are integrated. In other words, the impeller blade 2 (with the exception of the main boss portion body 22a made from a metal) and the base plate 3 are made from the identical synthetic resin materials.

In the unit impeller blade plate 21, the side (upper side in FIG. 1B) opposite the fixed attachment side of the base plate 3 is part of the cone surface in the shape corresponding to the shape of the front plate 1 and serves as an impeller blade tip surface 21a. In other words, the impeller blade tip surface 21a is not a flat surface. More specifically, the impeller blade tip surfaces 21a, 21a, . . . of the plurality of unit impeller blade plates 21, 21, . . . constituting the impeller blades 2 are constituted as parts of cone surface such that has a cone apex angle φ identical to the cone apex angle φ of the inner surface 1b (lower surface) of the front plate 1. A sharp-pointed ridge-like protrusion 4 is provided on the upper side of the impeller blade tip surfaces 21a, 21a, . . . along almost the entire surface. The sharp-pointed ridge-like protrusion 4 has a triangular cross section with an acute edge at the distal end (upper end). The lower surface of the sharp-pointed ridge-like protrusion is part of the impeller blade tip surface 21a in the widthwise direction, and the sharp-pointed ridge-like protrusion is formed integrally with the unit impeller blade plate 21 in an almost central zone in the widthwise direction. The cross section along the X1-X1 arrow in FIG. 1 is a line that passes through the center of the unit impeller blade plate 21. The cross section of the unit impeller blade plate 21 is usually hatched, but in this case it is left without hatching to distinguish from the base plate 3.

The height H of the sharp-pointed ridge-like protrusion 4 (the height from the impeller blade tip surface 21a) is substantially uniform (see FIG. 1D). Further, the shape of the sharp-pointed ridge-like protrusion 4, in a plan view thereof, is not particularly limited, provided that it does not cover the entire surface of the impeller blade tip surface 21a. In other words, the sharp-pointed ridge-like protrusion is provided to about ¼ to ¾ of the width of the impeller blade tip surface 21a. Where the width is too small, the fusion strength cannot be ensured, and where the width is too large, the effect of the invention of the present application cannot be demonstrated. It is preferred that the sharp-pointed ridge-like protrusion be provided to ½ or less of the width of the impeller blade tip surface 21a. It is even more preferred that the sharp-pointed ridge-like protrusion 4 be formed in a substantially central position in the widthwise direction, and more particularly that the sharp-pointed ridge-like protrusion 4 be formed so as to disappear gradually in the locations at both ends in the plan view of the unit impeller blade plate 21. Further, the sharp-pointed ridge-like protrusion 4 is also formed so that both ends thereof gradually disappear in the front view thereof (see FIG. 1B). The tip ridge lines of the sharp-pointed ridge-like protrusions 4, 4, . . . are in uniform contact with the inner surface 1b (lower surface) of the front plate 1 and ensure good fusion.

More specifically, the projection height of the sharp-pointed ridge-like protrusion 4 as a protrusion with a triangular cross section is about 0.3 mm to 0.8 mm. The shape of triangular protrusion is realized when the resin starts melting, but the tip portion in the form of an acute edge has higher sensitivity as a starting point for melting of the resin induced by vibrations. Therefore, the tip portion of the triangular protrusion in the form of an acute edge is preferred. Further, the triangular shape is produced by the shape of the mold for resin molding and therefore has to ensure easy machining of the mold.

Figure 3A:
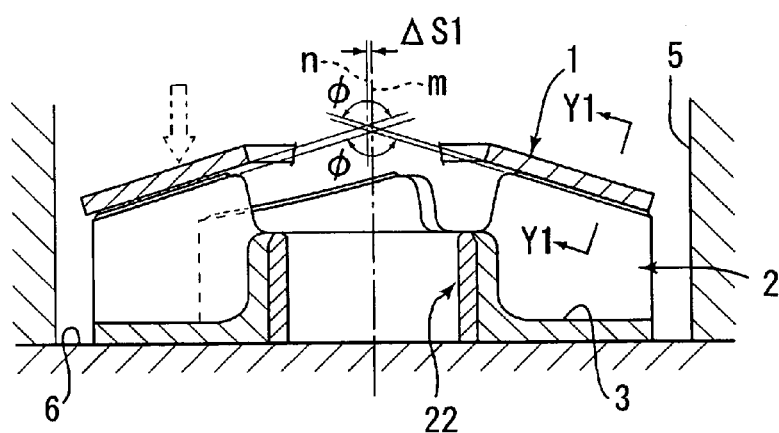
FIG. 3A is a state diagram of the present invention illustrating how the manufacturing method is started by abutting the front plate on the protrusions of the impeller blade apexes.
Figure 3B:
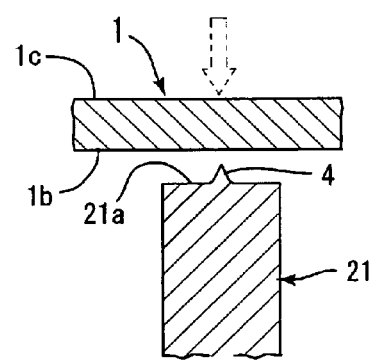
FIG. 3B is a cross-sectional view along the Y1-Y1 arrows in FIG. 3A.

In the manufacturing process, as shown in FIG. 2A and FIGS. 3A and 3B, the front plate 1 is placed from above on the impeller blade 2 with the base plate 3 attached thereto. In this case, a tubular guide member 5 (can be also a positioning member) is provided on the outer peripheral side of the impeller blade 2 with the base plate 3 attached thereto in close proximity of the impeller blade 2, but without contact therewith, thereby facilitating the process of setting the front plate 1 onto the sharp-pointed ridge-like protrusions 4. Even in such setting process, a displacement ΔS1 often appears between the central axis m of the impeller blade 2 with the base plate 3 attached thereto and the central axis n of the front plate 1, as shown in the figure. Further, as shown by a dot line in the figure, the front plate 1 located on a platform 6 is pressed downward by a predetermined pressure F against the impeller blade 2 with the base plate 3 attached thereto. In other words, a predetermined pressure F is applied between the front plate 1 and the impeller blade 2 with the base plate 3 attached thereto.

Figure 2B:
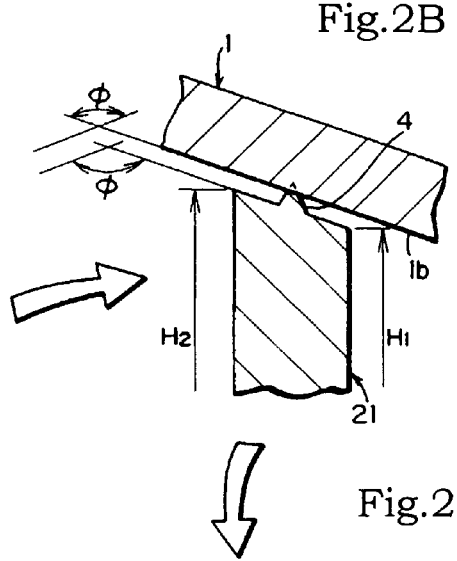
FIG. 2B is a state diagram of the present invention immediately after the application of vibrations have been started, while abutting the front plate on the protrusions of the impeller blade apexes.
Figure 2C:
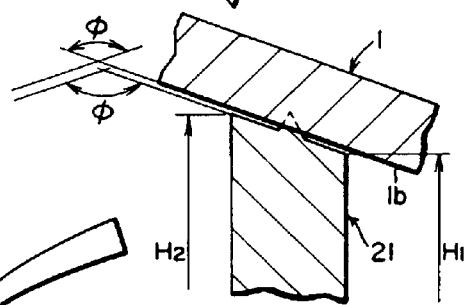
FIG. 2C is a state diagram of the present invention in the intermediate stage in which the vibrations are applied, while abutting the front plate on the protrusions of the impeller blade apexes.
Figure 2D:
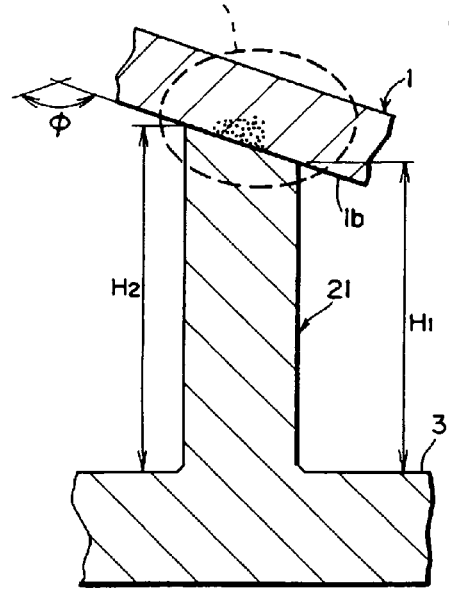
FIG. 2D is a state diagram of the present invention in the final stage in which the vibrations are applied, while abutting the front plate on the protrusions of the impeller blade apexes.
Figure 2E:
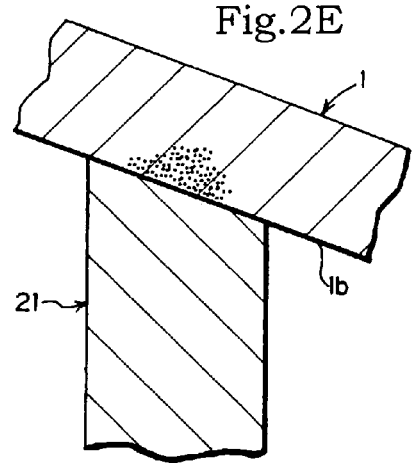
FIG. 2E is an enlarged view of the ($\alpha$) portion in FIG. 2D.
Figure 3C:
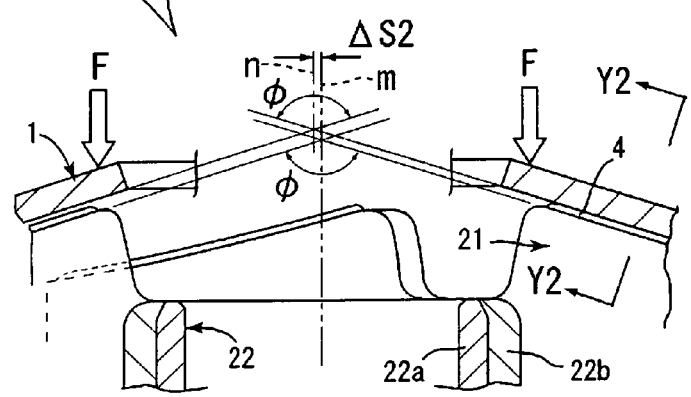
FIG. 3C is a state diagram of the present invention immediately after the application of vibrations have been started, while abutting the front plate on the protrusions of the impeller blade apexes.
Figure 3D:
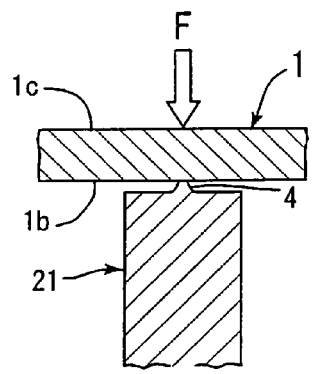
FIG. 3D is a cross-sectional view along the Y2-Y2 arrows in FIG. 3C.
Figure 4A:
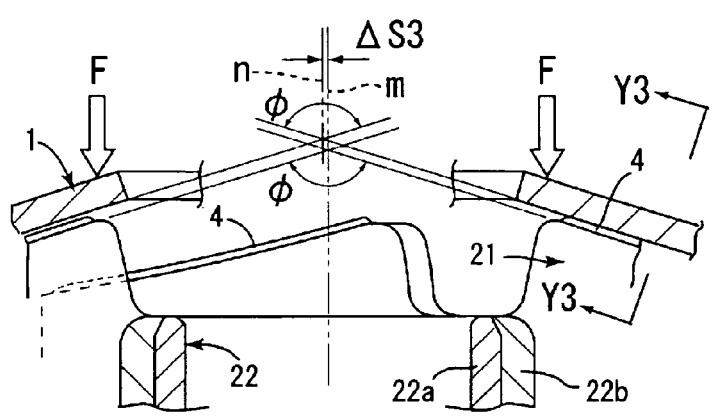
FIG. 4A is a state diagram of the present invention in the intermediate stage in which the vibrations are applied, while abutting the front plate on the protrusions of the impeller blade apexes.
Figure 4B:
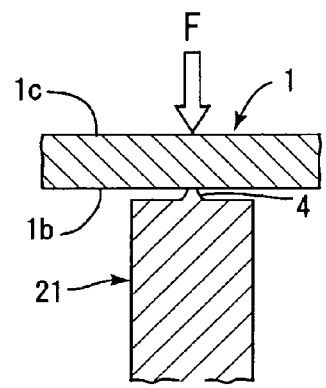
FIG. 4B is a cross-sectional view along the Y3-Y3 arrows in FIG. 4A.
Figure 4C:
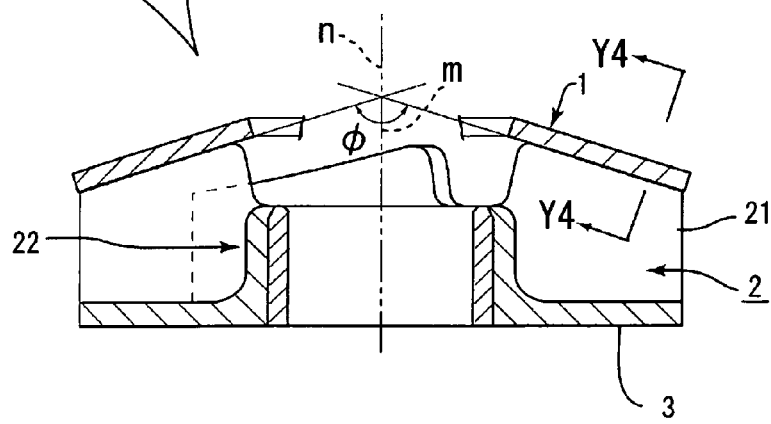
FIG. 4C is a state diagram of the present invention in the final stage in which the vibrations are applied, while abutting the front plate on the protrusions of the impeller blade apexes.
Figure 4D:
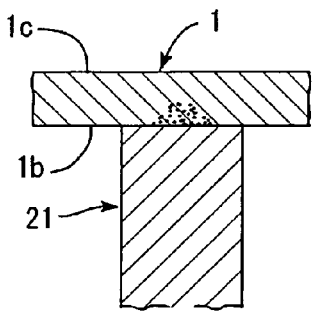
FIG. 4D is a cross-sectional view along the Y4-Y4 arrows in FIG. 4C.

In this state, vibrations such as ultrasonic waves are provided towards the front plate 1 and the sharp-pointed ridge-like protrusions 4, 4, . . . of the impeller blade tip surfaces 21a, 21a, . . . that are in contact with the front plate (see FIG. 2A and FIGS. 3A and 3B). As a result, as shown in FIG. 2B and FIGS. 3C and 3D, the edges of the tip portions of the sharp-pointed ridge-like protrusions 4, 4, . . . of the impeller blade tip surfaces 21a, 21a, . . . start melting. The edge remains the starting point for melting and once the melting has started, the sharp-pointed ridge-like protrusions 4, 4, . . . will gradually continue melting as the vibrations such as ultrasound waves are continually applied (see FIG. 2C and FIGS. 4A and 4B). Once the sharp-pointed ridge-like protrusions 4, 4, . . . have completely melted (see FIGS. 2D and 2E and FIGS. 4C and 4D), it is the impeller blade tip surface 21a that starts melting thereafter, and because the surface area of the impeller blade tip surface 21a is much larger than the cross section of the triangular sharp-pointed ridge-like protrusion 4, where the impeller blade tip surface 21a is to be melted, the surface area to be melted is much larger than that of the sharp-pointed ridge-like protrusion 4 and therefore very large energy of vibrations such as ultrasonic waves is required.

Figure 8A:
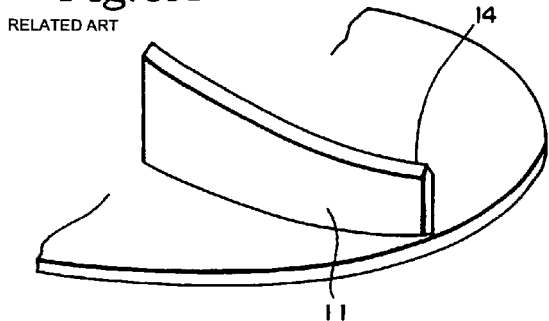
FIG. 8A shows FIG. 4C of U.S. Pat. No. 5,538,395 representing the related art.
Figure 8B:
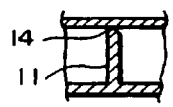
FIG. 8B shows FIG. 4B of U.S. Pat. No. 5,538,395.
Figure 8C:
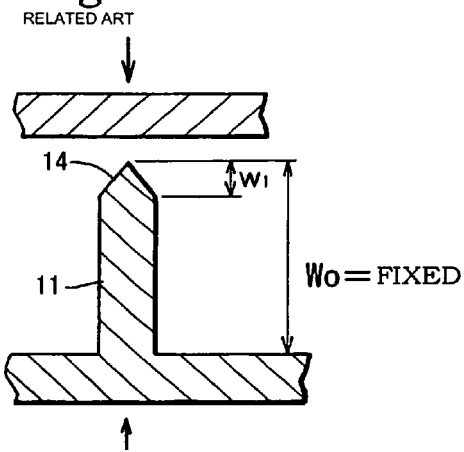
FIG. 8C shows a state diagram illustrating how the conventional manufacturing method is started.
Figure 8D:
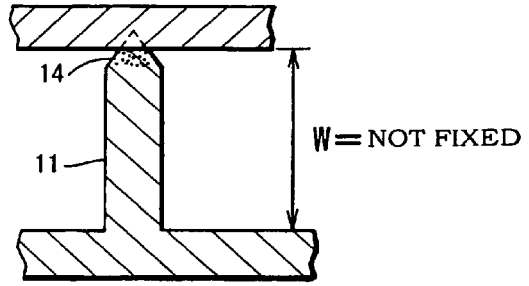
FIG. 8D is a virtual state diagram relating to the manufacturing method described in U.S. Pat. No. 5,538,395.
Figure 9A:
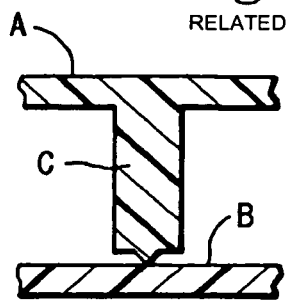
FIG. 9A shows FIG. 2A of Japanese Patent Application Laid-Open No. 53-54301 representing the related art.
Figure 9B:
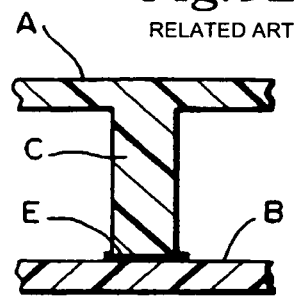
FIG. 9B shows FIG. 2B of Japanese Patent Application Laid-Open No. 53-54301.
Figure 9C:
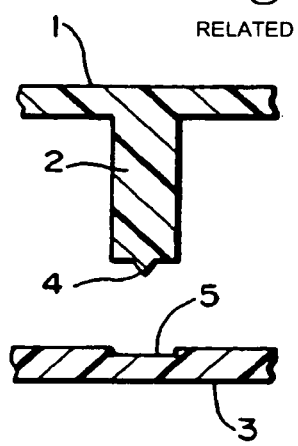
FIG. 9C shows FIG. 4 of Japanese Patent Application Laid-Open No. 53-54301.
Figure 9D:
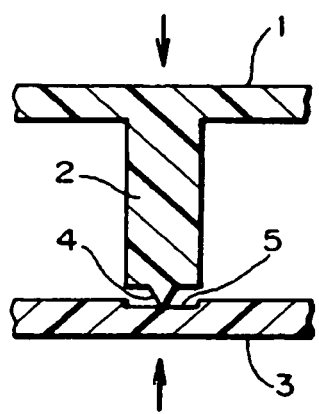
FIG. 9D shows FIG. 5A of Japanese Patent Application Laid-Open No. 53-54301.
Figure 9E:
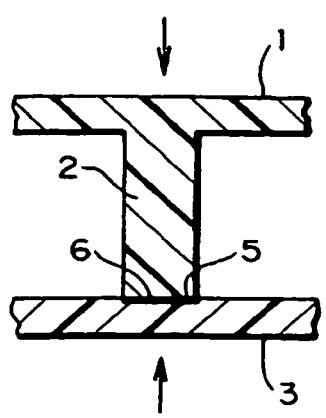
FIG. 9E shows FIG. 5B of Japanese Patent Application Laid-Open No. 53-54301.

In accordance with the present invention, in fusion conducted by vibrations such as ultrasonic waves, the triangular sharp-pointed ridge-like protrusion 4 is completely melted and then, after the impeller blade tip surface 21a in the location of the root section of the sharp-pointed ridge-like protrusion 4 has slightly melted, the supplied energy becomes insufficient and the resin does not melt anymore. Thus, with respect to a scheme according to which the sharp-pointed ridge-like protrusion 4 is melted completely, but then because of a significant increase in the surface area in the impeller blade tip surface 21a, much larger supplied energy is required to melt the resin, the result is the same when (1) ultrasonic waves, (2) vibrations, and (5) high frequency are used, and the common feature of all resin melting means using vibrations is that the triangular sharp-pointed ridge-like protrusion 4 is melted completely, but then the impeller blade tip surface 21a is slightly melted and the resin does not melt thereafter. Thus, where the melted resin is again naturally cooled and solidifies, the front plate 1 and impeller blade tip surface 21a are fixedly attached to each other (see FIG. 2D and FIG. 4C). FIGS. 2A to 2D show a cross section of the unit impeller blade plate 21 that passes through the cone apex O, and the plane of the impeller blade tip surface 21a is part of the cone apex angle φ. Accordingly, a small height H1 and a large height H2 (see FIG. 2A) of the unit impeller blade plate 21 prior to fusion remain unchanged, that is, the small height H1 and large height H2 (see FIG. 2D), even after fusion. In other words, the height prior to fusion is the same as the height after the fusion, a highly accurate closed impeller can be manufactured, and the technical effect obtained is different from that illustrated by FIG. 8D in U.S. Pat. No. 5,538,395.

The greatest merit is that the central axis m of the impelled blade 2 with the base plate 3 attached thereto coincides with the central axis n of the front plate 1. This is explained in detail as follows. The impeller blade tip surfaces 21a, 21a, . . . and the inner surface 1b of the front plate 1 are formed as parts of conical surface. In other words, the central axes are matched by applying vibrations in a state in which the cone apex angle φ of the front plate 1 coincides with the cone apex angle φ of the impeller blade tip surfaces 21a, 21a, . . . . Thus, moving the front plate 1 that has shifted from the center towards the center is generally called "alignment". In the present specification, this will be called "alignment action".

The present invention will be described below in greater detail. The impeller blade tip surfaces 21a, 21a, . . . as parts of cone surface are cones that have a high central portion and a height that decreases towards the outer periphery. The assembled front plate 1 is also part of the conical surface that has a high central portion and a height that decreases towards to the outer periphery, so as to correspond to part of the conical surface of the impeller blade tip surfaces 21a, 21a, . . . . A specific feature of such a configuration is that in the process in which the triangular sharp-pointed ridge-like protrusions 4, 4, . . . are melted, there are regions in which the impeller blade tip surfaces 21a, 21a, have not yet started melting. In other words, it is necessary that in the melting process the impeller blade tip surface 21a be a solid body in a hard state.

During irradiation with vibrations such as ultrasonic waves, the triangular sharp-pointed ridge-like protrusions 4, 4, . . . are melted, and the melted sharp-pointed ridge-like protrusions 4, 4, . . . composed of a resin are present at the impeller blade tip surface 21a. Therefore, the front plate 1 floats on the melted resin. In this state, vibrations such as ultrasonic waves are applied to the front plate 1, and because the impeller blade tip surface 21a corresponding to the front plate 1 is in a hard state of a solid body, the front plate 1 is not displaced in the radial (transverse) direction by the alignment action. This is a specific feature of the present invention.

Further, because the conical surface of the font plate 1 and the impeller blade tip surface 21a have high central portions, the front plate 1 that floats on the molten resin is moved towards the center by vibrations such as ultrasonic waves. As a result, the vibrations repeatedly bring the front plate 1, which is also a solid body, into contact (small collisions) with the solid impeller blade tip surface 21a that has not been melted. As a result, a force acting towards the center is applied to the front plate 1, the front plate 1 moves towards the center, and the application of vibrations produces an alignment action that matches the central axes.

In this case, the centers are not matched even by vibrations unless the surface of the impeller blade tip surface 21a that is outside the sharp-pointed ridge-like protrusion 4 and the inner surface 1b of the front plate 1 are both hard. This is because if the surfaces are soft, they absorb vibrations, the energy causing the movement towards the center is absorbed, and the so-called alignment action is not produced. As described in U.S. Pat. No. 5,538,395, where the protrusion of the impeller blade tip surface has a triangular shape over the entire width, the impeller blade tip surface is melted over the entire width by vibrations such as ultrasonic waves and the hard surface (solid surface) disappears, thereby inhibiting the "alignment action", which is a specific feature of the present invention.

The structure and manufacturing method according to the first embodiment of the present invention are described below. In other words, the shape of the front plate 1 and impeller blade tip surface 21a is essentially part of cone surface. This feature is explained by the cone shown in FIGS. 7A and 7B. In the first embodiment of the present invention, a cone is applied in which the generatrix is a straight line. In the description of the present invention, the surface portion of the cone is called "cone surface". A cone in which the generatrix is an arched (curved) line is called "arched cone", and the surface portion of the arched cone is called "arched cone surface". Further, a hierarchically higher concept of the cone and arched cone is "conical shape", and a hierarchically higher concept of the cone surface and arched cone surface is "conical surface".

The arched cone (see FIG. 7B) is used in the second embodiment and third embodiment of the present invention. Thus, as shown in FIGS. 5A and 5B, in the second embodiment relating to an arched cone type of a shape in which the intermediate section with a circular arc cross section is concaved inwardly and in the third embodiment relating to a type in which the intermediate section with a circular arc cross section bulges outwardly as shown in FIGS. 6A and 6B, the "alignment action" is also demonstrated similarly to the first embodiment of the present invention, provided that the cone apex angles $\phi 1$, $\phi 2$ of the impeller blade tip surface 21a and the front plate 1 corresponding thereto are identical. Therefore, these embodiments are within the technical scope of the present invention.

What is claimed is:

1. A method for manufacturing a closed impeller, the method comprising:
    forming a frustum-shaped front plate having no grooves for positioning and that includes an annular plate with a shape of a cut off of a head section of a cone, and a disk-shaped base plate formed therebelow, upper surfaces of a plurality of unit impeller blade plates comprising a synthetic resin extending in radial directions which are formed as impeller blade tip surfaces, with sharp-pointed ridge-like protrusions comprising an acute upper end and a width less than a width of the impeller blade tip surface being integrally formed on the impeller blade tip surfaces;
    forming an inner surface of the front plate and the plurality of impeller blade tip surfaces, other than the sharp-pointed ridge-like protrusions, formed as parts of conical surfaces that have a high central portion and a height that decreases towards an outer periphery, the forming being implemented such that cone apex angles of two conical surfaces are equal to each other, with the front plate being placed on the impeller blade having the base plate attached thereto, and the sharp-pointed ridge-like protrusions and the inner surface of the front plate being brought into contact with each other;
    providing small vibrations at a level, at which the sharp-pointed ridge-like protrusions are completely melted and then, after the impeller blade tip surface in the location of root section of the sharp-pointed ridge-like protrusions has slightly melted, supplied energy of said vibration becomes insufficient and the resin does not melt anymore, while applying an appropriate pressurizing force between the front plate and the impeller blade having the base plate attached thereto;
    melting the sharp-pointed ridge-like protrusions; and
    fusing the front plate to the impeller blade tip surfaces.

2. The method for manufacturing a closed impeller according to claim 1, wherein a height of the sharp-pointed ridge-like protrusion is substantially uniform.

3. The method for manufacturing a closed impeller according to claim 1, wherein a conical shape of the front plate and impeller blade tip surface are formed as a cone surface.

4. The method for manufacturing a closed impeller according to claim 1, wherein a conical shape of the front plate and impeller blade tip surface are formed as an arched cone surface.

5. The method for manufacturing a closed impeller according to claim 1, wherein the front plate comprises a same material as the unit impeller blade plates.

6. The method for manufacturing a closed impeller according to claim 1, wherein the front plate comprises a metal different from that of the unit impeller blade plates.

7. The method for manufacturing a closed impeller according to claim 2, wherein a conical shape of the front plate and impeller blade tip surface are formed as a cone surface.

8. The method for manufacturing a closed impeller according to claim 2, wherein a conical shape of the front plate and impeller blade tip surface are formed as an arched cone surface.

9. The method for manufacturing a closed impeller according to claim 2, wherein the front plate comprises a same material as the unit impeller blade plates.

10. The method for manufacturing a closed impeller according to claim 3, wherein the front plate comprises a same material as the unit impeller blade plates.

11. The method for manufacturing a closed impeller according to claim 4, wherein the front plate comprises a same material as the unit impeller blade plates.

12. The method for manufacturing a closed impeller according to claim 2, wherein the front plate comprises a metal different from that of the unit impeller blade plates.

13. The method for manufacturing a closed impeller according to claim 3, wherein the front plate comprises a metal different from that of the unit impeller blade plates.

14. The method for manufacturing a closed impeller according to claim 4, wherein the front plate comprises a metal different from that of the unit impeller blade plates.

15. The method for manufacturing a closed impeller according to claim 1, wherein the inner surface of the front plate and one the plurality of impeller blade tip surfaces, other than the sharp-pointed ridge-like protrusions, have a same cone apex angle.

16. The method for manufacturing a closed impeller according to claim 15, wherein the inner surface of the front plate and said one the plurality of impeller blade tip surfaces have the high central portion and the height that decreases towards an outer periphery.

17. The method for manufacturing a closed impeller according to claim 1, wherein the inner surface of the front plate and one the plurality of impeller blade tip surfaces have the high central portion and the height that decreases towards the outer periphery.

18. The method for manufacturing a closed impeller according to claim 1, wherein, after said melting the sharp-pointed ridge-like protrusions, the impeller blade tip surfaces other than the sharp-pointed ridge-like protrusions and the front plate remain as solid bodies.

19. The method for manufacturing a closed impeller according to claim 18, wherein, after said melting the sharp-pointed ridge-like protrusions, the front plate moves towards the central portion.

20. The method for manufacturing a closed impeller according to claim 1, wherein, after said melting the sharp-pointed ridge-like protrusions, the front plate moves towards the central portion.

* * * * *